(12) United States Patent
Beigi et al.

(10) Patent No.: US 6,246,982 B1
(45) Date of Patent: Jun. 12, 2001

(54) METHOD FOR MEASURING DISTANCE BETWEEN COLLECTIONS OF DISTRIBUTIONS

(75) Inventors: Homayoon S. M. Beigi, Yorktown Heights, NY (US); Stephane H. Maes, Danbury; Jeffrey S. Sorensen, Seymour, both of CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/237,063

(22) Filed: Jan. 26, 1999

(51) Int. Cl.$^7$ .............................. G10L 15/10; G10L 17/00
(52) U.S. Cl. ........................ 704/238; 704/239; 704/246
(58) Field of Search .................................. 704/238, 239, 704/246

(56) References Cited

U.S. PATENT DOCUMENTS

| | | | |
|---|---|---|---|
| 5,664,059 | * 9/1997 | Zhao | 704/254 |
| 5,787,396 | * 9/1998 | Komori et al. | 704/256 |
| 5,825,978 | * 10/1998 | Digalakis et al. | 704/256 |
| 6,009,390 | * 12/1999 | Gupta et al. | 704/240 |
| 6,064,958 | * 5/2000 | Takahashi et al. | 704/243 |

OTHER PUBLICATIONS

Thomas E. Flick, et al. "A Minimax Approach to Development of Robust Discrimination Algorithms for Multivariate Mixture Distributions," Proc. IEEE ICASSP 88, vol. 2, pp. 1264–1267, Apr. 1988.*

Homayoon sadr Mohammad Beigi, et al. "A Distance Measure Between Collections of Distributions and its Application to Speaker Recognition," Proc. IEEE ICASSP 98, vol. 2, pp. 753–756, May 1998.*

Geoff A. Jarrad, et al. "Shared Mixture Distributions and Shared Mixture Classifiers," Proc. IEEE IDC 99, pp. 335–340, Feb. 1999.*

* cited by examiner

Primary Examiner—Talivaldis I. Smits
(74) Attorney, Agent, or Firm—F. Chau & Associates, LLP

(57) ABSTRACT

A method for computing a distance between collections of distributions or finite mixture models of features. Data is processed so as to define at least first and second collections of distributions of features. For each distribution of the first collection, the distance to each distribution of the second collection is measured to determine which distribution of the second collection is the closest (most similar). The same procedure is performed for the distributions of the second collection. Based on the closest distance measures, a final distance is computed representing the distance between the first and second collections. This final distance may be a weighted sum of the closest distances. The distance measure may be used in a number of applications such as [speaker classification,] speaker recognition and audio segmentation.

19 Claims, 3 Drawing Sheets

FIG. 4A

Collection of Gaussians B

| | $B_1$ | $B_2$ | $B_3$ | ...... | $B_N$ | |
|---|---|---|---|---|---|---|
| $A_1$ | d11 | d12 | d13 | ...... | d1N | $W_1^A$ |
| $A_2$ | d21 | d22 | d23 | ...... | d2N | $W_2^A$ |
| $A_3$ | d31 | d32 | d33 | ...... | d3N | $W_3^A$ |
| . | . | . | . | . | . | . |
| . | . | . | . | . | . | . |
| . | . | . | . | . | . | . |
| $A_M$ | dM1 | dM2 | dM3 | ...... | dMN | $W_M^A$ |

Collections of Gaussians A (left); Weighted Row Minima (right)

FIG. 4B

Collection of Gaussians B

| | $B_1$ | $B_2$ | $B_3$ | ...... | $B_N$ |
|---|---|---|---|---|---|
| $A_1$ | d11′ | d12′ | d13′ | ...... | d1N′ |
| $A_2$ | d21′ | d22′ | d23′ | ...... | d2N′ |
| $A_3$ | d31′ | d32′ | d33′ | ...... | d3N′ |
| . | . | . | . | . | . |
| . | . | . | . | . | . |
| . | . | . | . | . | . |
| $A_M$ | dM1′ | dM2′ | dM3′ | ...... | dMN′ |
| | $W_1^B$ | $W_2^B$ | $W_3^B$ | ...... | $W_N^B$ |

Collections of Gaussians A

Weighted Column Minima

METHOD FOR MEASURING DISTANCE BETWEEN COLLECTIONS OF DISTRIBUTIONS

BACKGROUND OF THE INVENTION

The present invention relates generally to pattern recognition, which includes automated speech and speaker recognition. In particular, it relates to a computer-implemented data processing method for measuring distance between collections of audio feature distributions or finite mixture models.

In automated speech recognition, input speech is analyzed in small time frames and the audio content of each time frame is characterized by what is known as a feature vector. A feature vector is essentially a set of N audio features associated with that frame. Such audio features are typically the different spectral or cepstral parameters corresponding to the audio of that frame. In an attempt to recognize a spoken word or phoneme, test data comprised of a feature vector or feature vector sequence is compared to models (prototypes) of the sound of known vocabulary words or phonemes. These comparisons are performed using a distance measure, which is a measure of closeness between a pair of elements under consideration. Thus, a given feature vector or feature vector sequence is recognized as that phoneme or word corresponding to the prototype that is the shortest distance away.

In a typical speech recognition system, a different speaker model is developed for each speaker using the system. Prior to using the system for the first time, a speaker is prompted to utter a predetermined sequence of words or sentences to thereby supply training data to the system. The training data is employed to develop a speaker-dependent model containing a set of user-specific prototypes. During subsequent use of the system, the user typically needs to first register his/her identity. The user's speech is then compared only to the corresponding prototypes. An obvious drawback to this technique is the inability to practically recognize speech within a conference of many speakers, for example, due to the impracticality of speaker registration prior to each utterance. Hence, there is a need for a practical method to implement automatic speaker recognition. Also, in a general use environment, it is desirable to eliminate the necessity of collecting training data for new users.

SUMMARY OF THE DISCLOSURE

The present disclosure relates to a method for computing a distance between collections of distributions of feature data (e.g., audio features). In an illustrative embodiment, audio data is processed so as to define at least first and second collections of audio feature distributions, where each collection may be derived from a speech sample of an associated speaker. For each distribution of the first collection, the distance to each distribution of the second collection is measured to determine which distribution of the second collection is the closest (most similar). The same process is carried out for the distributions of the second collection. Based on the closest distance measures, a final distance is computed representing the distance between the first and second collections. This final distance may be a weighted sum of the closest distances. The distance measure may be used in a number of applications such as speaker classification, speaker recognition and audio segmentation.

BRIEF DESCRIPTION OF THE DRAWINGS

The following detailed description, given by way of example and not intended to limit the present invention solely thereto, will best be appreciated in conjunction with the accompanying drawings, in which like reference numerals denote like parts or elements, wherein:

FIGS. 4A and 4B are diagrams depicting an exemplary distance measure calculation between two collections of distributions according to the present invention.

DETAILED DESCRIPTION OF CERTAIN PREFERRED EMBODIMENTS

A preferred embodiment of the present invention will now be described in the context of a method for computing a distance between collections of distributions of audio data. However, it is understood that the invention is not so limited and may be applied to essentially any application in which it is desired to measure distance between collections of statistical distributions. For instance, the distance measure can be used as part of a pattern recognition process in imaging applications.

Figure 1:
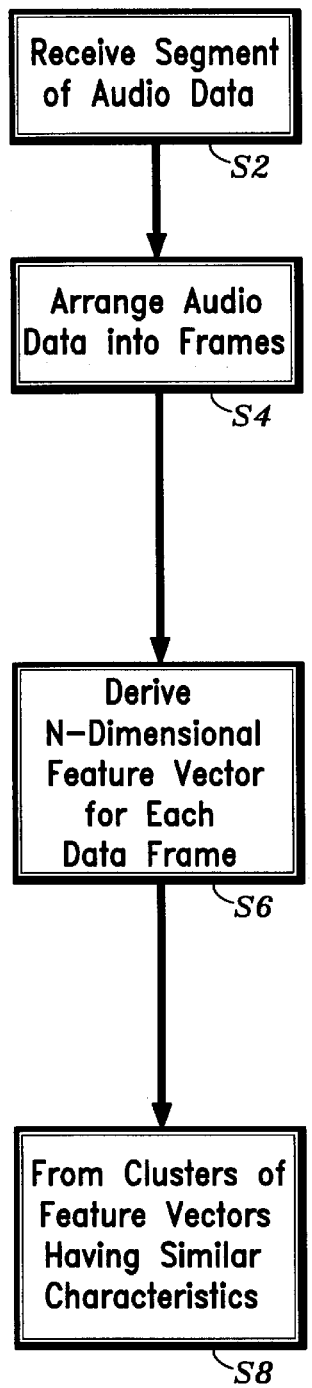
FIG. 1 illustrates a flow diagram of an exemplary software routine for processing audio data in accordance with the present invention.
Figure 1:
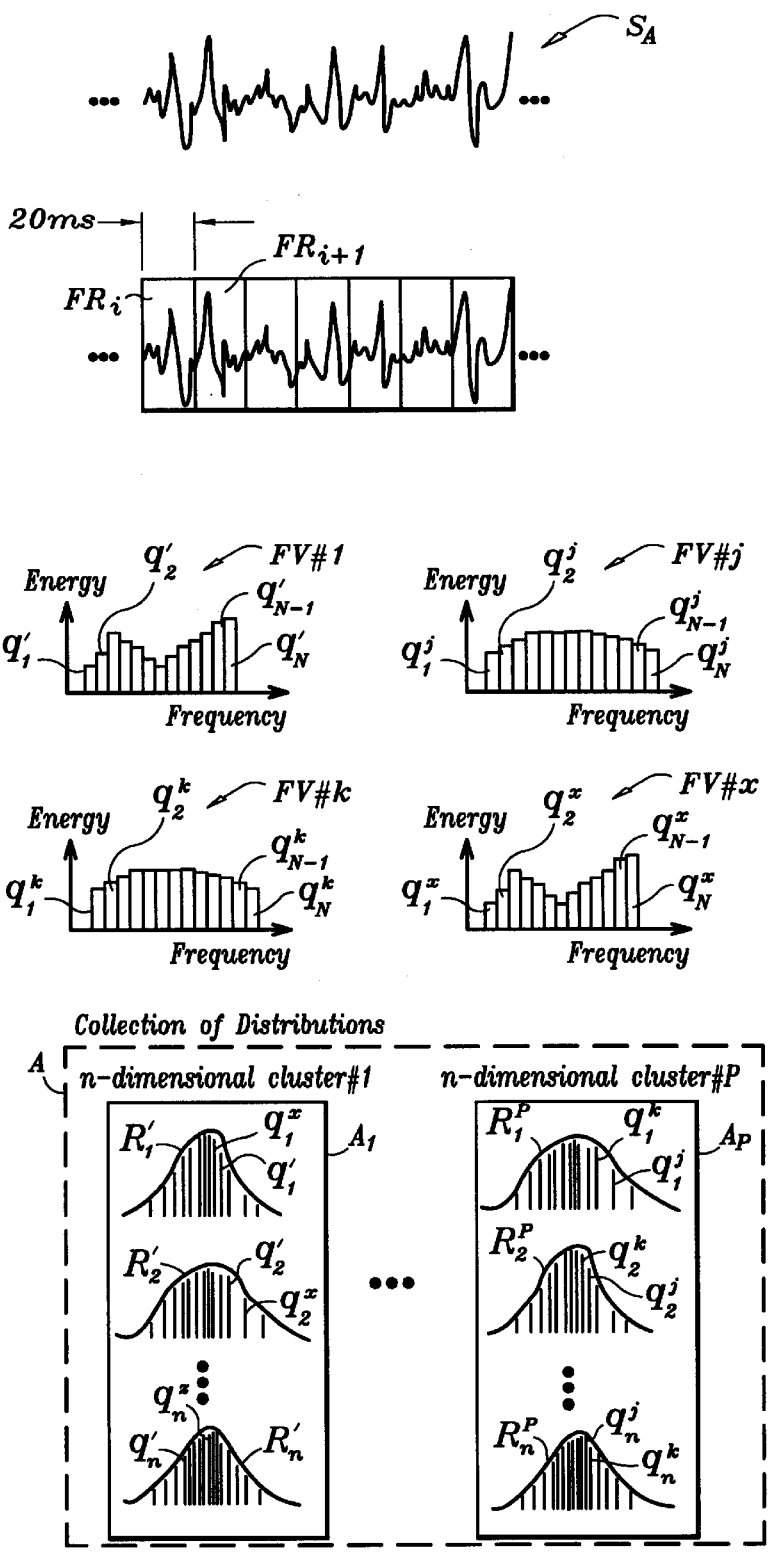

Referring now to FIG. 1, a flow chart of a software routine for implementing part of an exemplary embodiment of the invention is shown. Diagrams illustrating data processing taking place during the individual steps of the routine are depicted adjacent to the respective steps. The purpose of the routine is to extract features from an input audio data segment and then form clusters of features having similar characteristics. Each cluster is approximated by a Gaussian or other centralized statistical distribution. The routine is then repeated for additional audio segments to obtain further collections of distributions. In a subsequent calculation to be described below, the distance between two such collections of distributions is measured.

There are a number of applications in which such a distance measure is useful. These include speaker recognition, which encompasses speaker identification and speaker verification; speaker classification; and speech segmentation. For instance, assume the audio segment under consideration represents speech from one person. The collection of distributions (test collection) derived from that audio segment can be compared to other collections previously stored. Each stored collection is known to correspond to either a specific speaker or to a particular class of speakers, for which an associated speaker model (set of prototypes) is stored. Thus, by determining which stored collection has the shortest distance to the test collection, a suitable speaker model can be readily selected for the user without the requirement of the user registering with the system prior to each utterance. Other applications for the distance measurement will be discussed later.

It is noted here that a computer program encompassing the routine of FIG. 1, as well as further program instructions to implement the distance measurement described below, can be run on a general or special purpose computer. In addition, the program can be stored on a single program storage device such as an optical or magnetic disk readable by a computer.

As shown in FIG. 1, the first step S2 of the exemplary routine is to receive a segment of digitized audio data $S_A$, where the type of audio segment depends on the application. By way of example, the audio segment can be a speech signal of about a ten second duration. N-dimensional feature vectors are then extracted from the audio segment in a conventional manner. That is, the audio data is broken down into frames (step S4) as $FR_i$, $FR_{i+1}$, typically 10–20 ms long. Next, spectral components corresponding to each frame are derived and an N-dimensional feature vector such as a Mel-Warped Cepstral feature vector is defined for each frame (step S6). The feature vector is composed of N quantized spectral components of generally equal spectral ranges. Methods for computing Mel-Warped Cepstral feature vectors are known in the art—see, e.g., L. Rabiner and B. H. Juang, *Fundamentals of Speech Recognition*, Prentice Hall Signal Processing Series, Alan V. Oppenheim, Series Ed., New Jersey, 1993, pp. 125–128. One advantage of the Mel-Warped Cepstral feature is that it attempts to remove pitch from the spectrum and warps the frequency resolution of the representation to more closely model that of the Melody scale. In any event, alternatives to Cepstral feature vectors include fast fourier transform (FFT) based feature vectors, and feature vectors based on the first or second derivatives of Cepstral parameters.

To illustrate the feature vector approach, four feature vectors FV#1, FV#j, FV#k and FV#x are schematically shown. Each feature vector is quantized into N spectral components as $q_1^1$ to $q_1^N$ for FV#1; $q_1^j$ to $q_N^j$ for FV#j; and so forth. The way the spectral energy of each feature vector is apportioned among the components is, of course, dependent upon the audio characteristics of the corresponding frame. For instance, feature vectors FV#1 and FV#x have similarly apportioned spectral components, as do vectors FV#j and FV#k. Generally, feature vectors for audio frames with similar characteristics will likewise be similar. Hence, audio frames representing common phonemes of the same speaker will result in similar feature vectors for those frames.

With feature vectors thus established for each of the frames, the next step, S8, is to group feature vectors with similar characteristics into clusters. In general, similarity among feature vectors is determined by comparing, for a given feature vector, the energy level of each spectral component thereof to the energy levels of corresponding spectral components of other feature vectors. Feature vectors with small differences in energy levels averaged over the whole spectrum under consideration are grouped together to form part of a cluster. In the above example of a ten second audio segment which is divided into 500 frames (each 20 ms long), clusters of, for example, 20–30 feature vectors may be formed, resulting in approximately 20 clusters for each audio segment. Each cluster can be approximated by a Gaussian or other centralized distribution, which is stored in terms of its statistical parameters such as the mean vector, the covariance matrix and the number of counts ([samples] feature vectors in the cluster). In the feature vector illustration of FIG. 1, similar feature vectors FV#1 and FV#x are grouped together in cluster #1, while FV#j, FV#k are grouped as part of cluster #P.

One way to form clusters is by employing a bottom-up clustering technique in which all the feature vectors are first arranged in a stream. A predetermined number of cluster centers in the stream are randomly picked. Next, the K-Means algorithm as described in *Fundamentals of Speech Recognition*, supra, is run to come up with new cluster centers in an iterative fashion. Eventually, after the convergence of the K-Means algorithm, the predetermined number of N-dimensional vectors of means and their corresponding variances are available. The covariance matrix is normally (but not necessarily) assumed to be diagonal, resulting in an n-dimensional variance vector. Other assumptions may alternatively be used.

Within each cluster, the corresponding spectral components of each feature vector are also grouped so as to define N Gaussian distributions (i.e., comprising [an] [N] n-dimensional distributions). For instance, distribution $R_1^1$ is defined for the lowest frequency components $q_1^1, q_1^x$, etc., of the grouped feature vectors of cluster #1. The distribution represents the variation in energy levels of those frequency components. Similarly, distribution $R_1^1$ is defined for the highest frequency components of cluster #1, and so forth. N-dimensional distributions $A_1$ to $A_p$ are thereby defined (for P clusters), which form a collection of n-dimensional distributions A for the audio segment $S_A$. The process is repeated for subsequent audio segments to obtain further collections. Once two or more of such collections of n-dimensional distributions are obtained, the distance measurement between collections in accordance with the invention is carried out.

Figure 2:
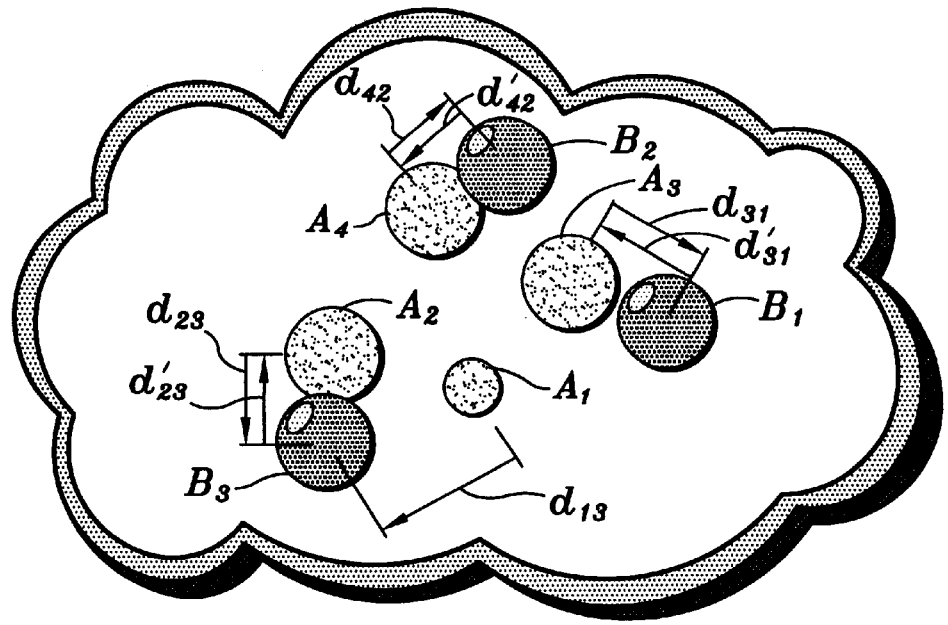
FIGS. 2 and 3 are diagrams illustrating an aspect of a distance measure of the present invention.

FIG. 2 illustrates the general principle underlying the distance measurement of the present invention. In this example, the distance measurement is between a collection A containing n-dimensional distributions $A_1, A_2, A_3$ and $A_4$, and a collection B containing n-dimensional distributions $B_1$, $B_2$ and $B_3$. The "inter-collection" distance between collections A and B is computed by determining which n-dimensional distribution of collection B has the closest distance to each individual n-dimensional distribution of collection A, and vice versa. The inter-collection distance is essentially a weighted sum of these closest "inter-distribution" distances. The weighting is based on the number of samples (e.g. dimensions or distributions corresponding to the number of spectral components in a cluster) in each n-dimensional distribution. Note that the distance measured from a n-dimensional distribution of collection B to one in collection A is designated with a prime whereas the distance in the opposite direction is not. For example, distance d31 is measured from n-dimensional distributions $A_3$ to n-dimensional distributions $B_1$; distance d31" is measured from n-dimensional distributions $B_1$ to $A_3$. These distances may differ in certain circumstances. one example is when a non-symmetrical distance measure is utilized, e.g., where the measured distance depends upon a constant based on the number of counts (e.g., dimensions/distributions) in the first (nearside) n-dimensional distribution. In the example shown, n-dimensional distributions $A_2$ and $B_3$ are the closest neighbors to one another; as are $B_2, A_4$; and $A_3$, $B_1$.

The distance d13 between the small n-dimensional distributions $A_1$, and its closest neighbor, $B_3$, is also added to the distance measurement, but is counted only in one direction instead of in both directions as for the other pairs. This approach is used to reduce the effect of outliers if present, i.e., an n-dimensional distributions resulting from noise, etc. which are largely irrelevant to the primary audio signal under consideration. For instance, assume that collection A is created from the same data as collection B was created from, with the addition of some noise. Given the new data (i.e., old data plus noise) and also because of some random effects such as those associated with initializing the seeds of a bottom-up clusterer (e.g., k-means), collection A may end up with slightly different n-dimensional distributions with one of its clusters being split up into two. Accordingly, the distance measure should show some robustness to the fact that a new cluster has been generated. However, it is desirable to consider the clusters which paired up more than the ones left out. In the present embodiment, this is implemented by adding the distance between the abandoned cluster (n-dimensional distributions $A_1$ in FIG. 2) to the closest cluster only once.

The inter-distribution distances, e.g., between n-dimensional distributions $A_i$ and $B_j$, can be measured using a conventional distance. One choice is the following Euclidean distance:

$$d_E^{ij} = \|\mu^{(i)} - \mu^{(j)}\|_E \tag{1}$$

where $d_E^{ij}$ is the Euclidean distance between $A_i$ and $B_j$; $\mu^{(i)}$ is the mean of $A_i$; $\mu^{(j)}$ is the mean of $B_j$ and the subscript E denotes a Euclidean measure.

A second choice for the distance measure is the (Mahalonobis)Mahalanobis distance, namely:

$$d_M^{ij} = (\mu^{(i)} - \mu^{(j)})^T \Sigma^{-1}(\mu^{(i)} - \mu^{(j)}) \tag{2}$$

where $d_M^{ij}$ is the (Mahalonobis)Mahalanobis distance between $A_i$ and $B_j$, T denotes the transpose of a matrix, and $\Sigma$ denotes the covariance matrix.

A third choice for the distance measure is the following Kullback-Leibler formula:

$$\xi_l = (\mu_l^{(i)} - \mu_l^{(j)})^2;$$
$$d_{kl}^{ij} = \sigma_l^{(i)}/\sigma_l^{(j)} + \sigma_l^{(j)}/\sigma_l^{(i)} + \xi_l/\sigma_l^{(i)} + \xi_l/\sigma_l^{(j)} \tag{3}$$

where $d_{kl}^{ij}$ denotes the Kullback-Leibler distance between n-dimensional distributions $A_i$ and $B_j$; $\xi_l$ is a defined intermediate variable; $\mu_l^{(i)}$ and $\mu_l^{(j)}$ are the means of the respective n-dimensional distributions $A_i$ and $B_j$; $\sigma_l^{(i)}$ and $\sigma_l^{(j)}$ are the standard deviations of the $A_i$ and $B_j$ n-dimensional distributions, respectively, and the subscript "1" denotes the 1th element of the associated parameter ($\mu$ or $\sigma$).

Figure 3:
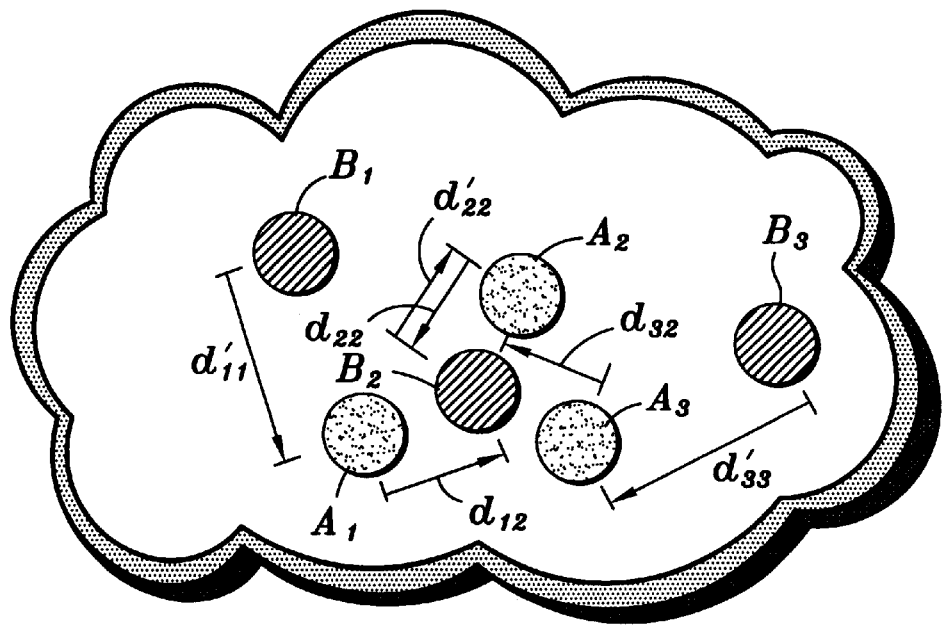

FIG. 3 presents an atypical relationship between a different pair of collections A and B. In this example, the closest n-dimensional distribution to each of the A n-dimensional distributions $A_1$, $A_2$ and $A_3$ is a common n-dimensional distribution, $B_2$. Contrarily, the closest n-dimensional distribution of the A set to each of the B n-dimensional distributions is different. That is, $A_1$ is closest to $B_1$; $B_2$ is closest to $A_2$; and $A_3$ is closest to $B_3$. The inter-collection distance between collections A and B is nevertheless computed in the same way as for the example of FIG. 2 above. In the case of FIG. 3, the inter-collection distance will be a weighted sum of the distances d12, d22, d32, d11', d22' and d33'.

Referring now to FIGS. 4A and 4B, the distance measurement of the present embodiment is illustrated in more detail. It is assumed that collection A contains M n-dimensional distributions $A_1$–$A_M$ and collection B contains N n-dimensional distributions $B_1$–$B_N$. As shown in FIG. 4A, an array of weighted row minima $W_1^A$ to $W_M^A$ is computed by first calculating the distance from each A n-dimensional distribution[s] to each B n-dimensional distribution[s] to form a matrix of distances from d11 to dMN. Thus, to form the first row of the matrix, distance d11 from [distributions] $A_1$ to [distributions] $B_1$ is computed; distance d12 from $A_1$ to $B_2$ is computed, etc., until distance d1N is determined to complete the row. The process is repeated for the other rows. These inter-distribution distances can be computed using a conventional calculation such as any of eqns. (1) to (3). Next, the minimum distance in each row is determined. This minimum distance is multiplied by the counts (number of [samples] spectral components) for the clusters corresponding to the A n-dimensional distributions to arrive at the weighted row minima $W_i^A$ for row i (i=1 to M). Thus, if the counts for n-dimensional distributions $A_i$ are designated $c_i^A$, then, $$W_i^A = c_i^A(\text{diy}) \tag{4}$$

where diy is the minimum distance in row i (distance between n-dimensional distributions $A_i$ and $B_Y$).

Similarly, as shown in FIG. 4B, the distances d11' to dMN' from each of $B_1$ to $B_N$ to each of $A_1$ to $A_M$ are computed. For each column j (j=1 to N), the minimum distance dxj' is computed (i.e., the distance from $B_j$ to $A_x$). Weighted column minimum $W_j^B$ for each column j [is] are then determined from:

$$W_j^B = C_j^B(\text{dxj'}) \tag{5}$$

where $C_j^B$ denotes the counts for the cluster corresponding to n-dimensional distributions $B_j$.

With weighted row minima $W_{1A}^A$–$W_M^A$ and column minima $W_1^B$ to $W_N^B$ thus computed and stored in memory, the inter-collection distance $D_{AB}$ is computed in accordance with eqn. (6):

$$D_{AB} = \frac{\sum_{i=1}^{M} W_i^A + \sum_{j=1}^{N} W_j^B}{\sum_{i=1}^{M} c_i^A + \sum_{j=1}^{N} c_j^B} \tag{6}$$

The inter-collection distance measure of eqn. (6) can be used in a number of speech recognition applications. One application which leads to other beneficial uses is speaker classification. A speaker can be classified into a class using the distance measure disclosed herein by analyzing an audio segment of the speaker to obtain a collection of distributions (test collection) and then measuring the distance between the test collection and other collections associated with other speakers. Each speaker is classified into a class of similar speakers with close distances. One way to establish classes is to use a bottom-up clustering technique using collections (models) of various speakers, without the need for the original data from which those models were derived. Once such clustering is performed, a few classes are created with a set of speaker models in each. A recognition prototype is trained and stored for each class. Thus, once a new speaker comes in, the first few seconds of speech may be used to find the class of speakers which is the closest to that speaker, and the corresponding prototype may be used for speech recognition.

Speaker clustering is also used in audio segmentation, where it is desired to separate out the different types of audio of an audio stream. For instance, in an article by H. Beigi et al., entitled "Speaker, Channel and Environment Change Detection", World Automation Congress, ISSCI98, Anchorage Alaska, May 18–22, 1998, which is incorporated herein by reference, a speaker segmentation problem is described in which a stream of speech and non-speech is segmented into pieces corresponding to music, noise, and different speakers. The segmentation algorithm described therein first segments the stream into small pieces based on some other distance measure. Then, these over-segmented pieces are combined to create fewer classes. This merging can be done based on the distance measure disclosed herein. The purpose of such clustering is to pull together all the speech segments from the same speaker into just one or just a few clusters so that a training model would be built for each speaker. Later, in a decoding session, incoming speech is decoded with a more suitable model.

As stated earlier, the distance measure disclosed herein is also useful in speaker recognition, which encompasses speaker identification and speaker verification. A new speaker can be identified or verified by analyzing a short, random audio segment to obtain a collection of distributions (test collection). Using the distance measure, the test collection is compared to stored collections corresponding to specific speakers. A match is determined to exist if the distance to one of the stored collections is less than a predetermined small threshold.

While the present invention has been described above with reference to specific embodiments thereof, it is understood that one skilled in the art may make many modifications to the disclosed embodiments without departing from the spirit and scope of the invention as defined by the appended claims.

What is claimed is:

1. A computer-implemented method for extracting audio features from audio data, comprising the steps of:

defining at least first and second collections of distributions of features from said data;

for each distribution of said first collection, determining which distribution of said second collection has the closest distance thereto, whereby a plurality of closest distances are obtained; and computing a final distance between said first and second collections based at least upon said closest distances.

2. The method of claim 1 wherein said plurality of closest distances comprise a first plurality of closest distances, and wherein said method further comprises:

for each distribution of said second collection, determining which distribution of said first collection has the closest distance thereto to thereby obtain a second plurality of closest distances, with said final distance being computed based on weighted sums of said first and second pluralities of closest distances.

3. The method of claim 2 wherein said final distance is computed in accordance with the following equation:

$$D_{AB} = \frac{\sum_{i=1}^{M} W_i^A + \sum_{j=1}^{N} W_j^B}{\sum_{i=1}^{M} c_i^A + \sum_{j=1}^{N} c_j^B}$$

where $D_{AB}$ is said final distance between said first collection A and said second collection B, M is the number of distributions of said collection A, N is the number of distributions of said collection B, $c_i^A$ is the count for the ith distribution $A_i$ of collection A, $c_j^B$ is the count for the jth distribution $B_j$ of collection B, $W_i^A$ is the product of $c_i^A$ and a parameter diy representing the minimum distance between distribution $A_i$ and all individual distributions in collection B, and $W_j^B$ is the product of $c_j^B$ and a parameter dxj' representing the minimum distance between distribution $B_j$ and all individual distributions of collection A.

4. The method of claim 3 wherein the number of distributions M differs from the number of distributions N.

5. The method of claim 1 wherein each said collection of distributions is derived from a speech sample of a single speaker.

6. The method of claim 1 wherein each said distribution is a multi-dimensional Gaussian distribution.

7. The method of claim 1 wherein said data is audio data, and each said collection is derived from an associated time segment of said audio data.

8. The method of claim 7 wherein distributions of a given said collection are derived by clustering similar audio features of the associated time segment to form a number of clusters, with each distribution corresponding to one of said clusters.

9. The method of claim 8 wherein said clusters are formed by arranging feature vectors in a stream, randomly picking a predetermined number of cluster centers in the stream, and running the K-means algorithm to determine cluster centers in an iterative fashion to produce each said distribution as an N-dimensional vector of means and corresponding variances.

10. The method of claim 1 wherein each of said features is a Mel-Warped Cepstral feature.

11. The method of claim 1 wherein said step of determining which distribution of said second collection has the closest distance to each distribution of said first collection is performed by computing distances between distributions using a distance selected from the group consisting of the Euclidean, Mahalanobis and Kullback-Leibler distances.

12. A speaker classification method, comprising the steps of:

defining at least first and second collections of distributions of features from speech data, with each collection being derived from a speech sample of a single speaker;

for each distribution of said first collection, determining which distribution of said second collection has the closest distance thereto, whereby a plurality of closest distances are obtained;

computing a final distance between said first and second collections based at least upon said closest distances; and classifying said first and second collections as part of the same class of speakers if the final distance is closer than a predetermined distance.

13. The method of claim 12 wherein said plurality of closest distances comprise a first plurality of closest distances, and wherein said method steps further comprise:

determining, for each distribution of said second collection, which distribution of said first collection has the closest distance thereto to thereby obtain a second plurality of closest distances, with said final distance being computed based on weighted sums of said first and second pluralities of closest distances.

14. The method of claim 13 wherein said final distance is computed in accordance with the following equation:

$$D_{AB} = \frac{\sum_{i=1}^{M} W_i^A + \sum_{j=1}^{N} W_j^B}{\sum_{i=1}^{M} c_i^A + \sum_{j=1}^{N} c_j^B}$$

where $D_{AB}$ is said final distance between said first collection A and said second collection B, M is the number of distributions of said collection A, N is the number of distributions of said collection B, $c_i^A$ is the count for the ith distribution $A_i$ of collection A, $C_j^B$ is the count for the jth distribution $B_j$ of collection B, $W_i^A$ is the product of $c_i^A$ and a parameter diy representing the minimum distance between distribution $A_i$ and all individual distributions in collection B, and $W_j^B$ is the product of $c_j^B$ and a parameter dxj' representing the minimum distance between distribution $B_j$ and all individual distributions of collection A.

15. A program storage device readable by a machine, tangibly embodying a program of instructions executable by the machine to provide method steps for extracting features from data, said method steps comprising:

defining at least first and second collections of distributions of features from said data;

for each distribution in said first collection, determining which distribution of said second collection has the closest distance thereto; and computing a final distance between said first and second collections based at least upon said closest distances.

16. The program storage device of claim 15 wherein said data comprises audio data and said features comprise audio features.

17. The program storage device of claim 15 wherein said plurality of closest distances comprise a first plurality of closest distances, and wherein said method steps further comprise:

determining, for each distribution of said second collection, which distribution of said first collection has the closest distance thereto to thereby obtain a second plurality of closest distances, with said final distance being computed based on weighted sums of said first and second pluralities of closest distances.

18. The program storage device of claim 15 wherein said final distance is computed in accordance with the following equation:

$$D_{AB} = \frac{\sum_{i=1}^{M} W_i^A + \sum_{j=1}^{N} W_j^B}{\sum_{i=1}^{M} c_i^A + \sum_{j=1}^{N} c_j^B}$$

where $D_{AB}$ is said final distance between said first collection A and said second collection B, M is the number of distributions of said collection A, N is the number of distributions of said collection B, $c_i^A$ is the count for the ith distribution $A_i$ of collection A, $c_j^B$ is the count for the jth distribution $B_j$, of collection B, $W_i^A$ is the product of $c_i^A$ and a parameter diy representing the minimum distance between distribution $A_i$, and all individual distributions in collection B, and $W_j^B$ is the product of $c_j^B$ and a parameter dxj' representing the minimum distance between distribution $B_j$ and all individual distributions of collection A.

19. The program storage device of claim 15 wherein each of said features is a Mel-Warped Cepstral feature.

* * * * *